United States Patent
Yamamura et al.

(10) Patent No.: US 10,713,762 B2
(45) Date of Patent: Jul. 14, 2020

(54) IMAGE FORMING APPARATUS

(71) Applicants: Hiroki Yamamura, Kanagawa (JP);
Makoto Yasuda, Kanagawa (JP);
Kazumi Kobayashi, Tokyo (JP)

(72) Inventors: Hiroki Yamamura, Kanagawa (JP);
Makoto Yasuda, Kanagawa (JP);
Kazumi Kobayashi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/524,572

(22) Filed: Jul. 29, 2019

(65) Prior Publication Data
US 2020/0074598 A1  Mar. 5, 2020

(30) Foreign Application Priority Data
Aug. 30, 2018  (JP) .................................. 2018-161949

(51) Int. Cl.
| | | |
|---|---|---|
| G06T 5/00 | (2006.01) | |
| G03G 15/00 | (2006.01) | |
| G06T 7/44 | (2017.01) | |
| B41J 2/21 | (2006.01) | |

(52) U.S. Cl.
CPC ............. *G06T 5/003* (2013.01); *B41J 2/2139* (2013.01); *G03G 15/556* (2013.01); *G06T 7/44* (2017.01)

(58) Field of Classification Search
None
See application file for complete search history.

(56) References Cited

U.S. PATENT DOCUMENTS

| | | | | |
|---|---|---|---|---|
| 8,693,060 B2* | 4/2014 | Ito | .......................... | H04N 1/504 |
| | | | | 358/1.14 |
| 9,052,663 B2* | 6/2015 | Suzuki | ............... | G03G 15/5025 |
| 9,383,705 B2* | 7/2016 | Hirai | .................. | G03G 15/5058 |
| 9,651,910 B2* | 5/2017 | Kosuge | .............. | G03G 15/5058 |
| 9,854,188 B2* | 12/2017 | Levoy | .................. | H04N 5/2178 |
| 2005/0185973 A1* | 8/2005 | Hama | ................ | G03G 15/5058 |
| | | | | 399/27 |
| 2006/0002724 A1 | 1/2006 | Fujimori et al. | | |

(Continued)

FOREIGN PATENT DOCUMENTS

| | | |
|---|---|---|
| JP | 2011-215582 | 10/2011 |
| JP | 2016-104544 | 6/2016 |
| JP | 2018-081244 | 5/2018 |

*Primary Examiner* — Dung D Tran
(74) *Attorney, Agent, or Firm* — Oblon, McClelland, Maier & Neustadt, L.L.P.

(57) ABSTRACT

An image forming apparatus includes an image forming device to form a correction image, an image density detector to detect image densities of a plurality of areas in the correction image, and circuitry to correct an image formation condition of the image forming device based on detected image densities of the plurality of areas. The circuitry replaces a detected image density of an area of interest selected from the plurality of areas with an average value of detected image densities of two or more areas including adjacent areas adjacent to the area of interest and corrects the image formation condition of the image forming device based on the detected image densities of the plurality of areas after replacement when a difference between the detected image density of the area of interest and at least one of the detected image densities of the adjacent areas exceeds a predetermined threshold.

5 Claims, 14 Drawing Sheets

(56) References Cited

U.S. PATENT DOCUMENTS

| | | |
|---|---|---|
| 2006/0024076 A1 | 2/2006 | Kato et al. |
| 2006/0099009 A1 | 5/2006 | Miyamoto et al. |
| 2006/0120767 A1 | 6/2006 | Miyamoto et al. |
| 2007/0036566 A1 | 2/2007 | Takeuchi et al. |
| 2007/0065164 A1 | 3/2007 | Fujimori et al. |
| 2007/0104499 A1 | 5/2007 | Ariizumi et al. |
| 2007/0110455 A1 | 5/2007 | Ariizumi et al. |
| 2007/0110457 A1 | 5/2007 | Kato et al. |
| 2007/0116480 A1 | 5/2007 | Takeuchi et al. |
| 2007/0140749 A1 | 6/2007 | Miyamoto et al. |
| 2008/0175611 A1* | 7/2008 | Tomita ............... G03G 15/0849 399/49 |
| 2011/0194863 A1 | 8/2011 | Matsumoto et al. |
| 2011/0228355 A1 | 9/2011 | Morita et al. |
| 2015/0037049 A1 | 2/2015 | Shiraishi et al. |
| 2015/0050033 A1 | 2/2015 | Kasai et al. |
| 2015/0362879 A1* | 12/2015 | Kaneko ............... G03G 15/556 399/49 |
| 2016/0070198 A1 | 3/2016 | Morinaga et al. |
| 2016/0147174 A1 | 5/2016 | Yasuda et al. |
| 2018/0150010 A1* | 5/2018 | Sone ............... G03G 15/5058 |

* cited by examiner

IMAGE FORMING APPARATUS

CROSS-REFERENCE TO RELATED APPLICATION

This patent application is based on and claims priority pursuant to 35 U.S.C. § 119(a) to Japanese Patent Application No. 2018-161949, filed on Aug. 30, 2018, in the Japan Patent Office, the entire disclosure of which is hereby incorporated by reference herein.

BACKGROUND

Technical Field

Embodiments of the present disclosure relate to an image forming apparatus.

Description of the Related Art

Certain image forming apparatuses include an image forming device, an image density detector configured to detect image densities of a plurality of areas in a predetermined correction image formed by the image forming device, and a correction unit configured to correct an image formation condition of the image forming device based on the detected image densities.

SUMMARY

Embodiments of the present disclosure describe an improved image forming apparatus that includes an image forming device configured to form a correction image, an image density detector configured to detect image densities of a plurality of areas in the correction image, and circuitry configured to correct an image formation condition of the image forming device based on detected image densities of the plurality of areas detected by the image density detector. The circuitry is configured to execute replacement processing to replace a detected image density of an area of interest selected from the plurality of areas with an average value of detected image densities of two or more areas including adjacent areas adjacent to the area of interest, and correct the image formation condition of the image forming device based on the detected image densities of the plurality of areas after the replacement processing when a difference between the detected image density of the area of interest and at least one of the detected image densities of the adjacent areas exceeds a predetermined threshold.

BRIEF DESCRIPTION OF THE SEVERAL VIEWS OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
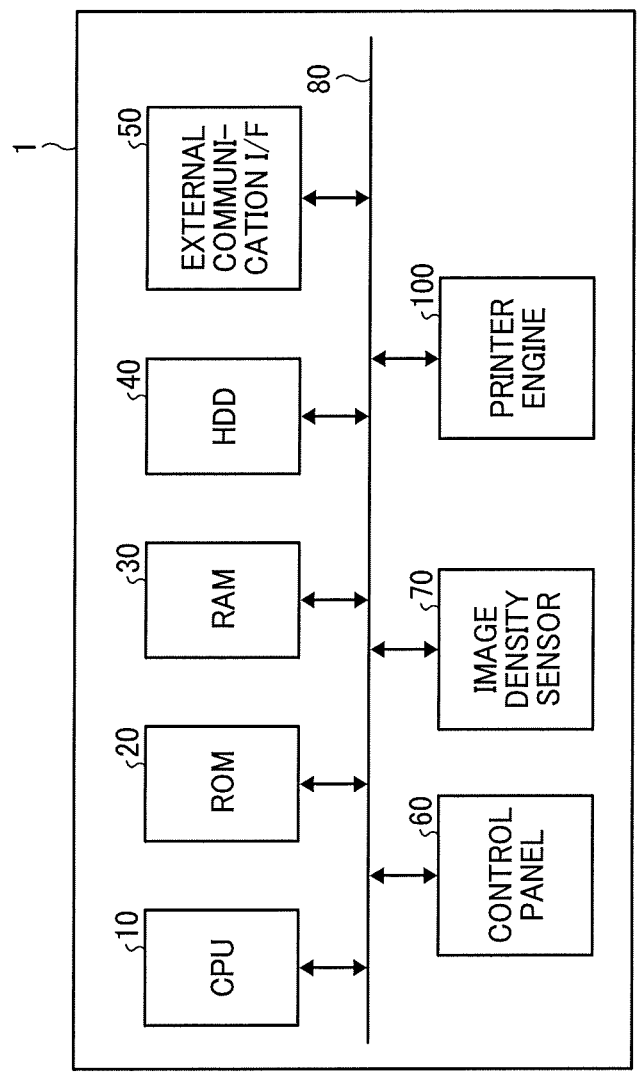
FIG. 1 is a block diagram illustrating a hardware configuration of an image forming apparatus according to embodiments of the present disclosure.

The accompanying drawings are intended to depict embodiments of the present disclosure and should not be interpreted to limit the scope thereof. The accompanying drawings are not to be considered as drawn to scale unless explicitly noted. In addition, identical or similar reference numerals designate identical or similar components throughout the several views.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

As used herein, the singular forms "a", "an", and "the" are intended to include the plural forms as well, unless the context clearly indicates otherwise.

It is to be noted that the suffixes Y, M, C, and K attached to each reference numeral indicate only that components indicated thereby are used for forming yellow, magenta, cyan, and black images, respectively, and hereinafter may be omitted when color discrimination is not necessary.

Descriptions are given below of an image forming apparatus according to embodiments of the present disclosure.

FIG. 1 is a block diagram illustrating a hardware configuration of an image forming apparatus 1 according to the present embodiment.

As illustrated in FIG. 1, the image forming apparatus 1 according to the present embodiment includes a central processing unit (CPU) 10 functioning as a correction unit (or circuitry), a read only memory (ROM) 20, a random access memory (RAM) 30, a Hard Disk Drive (HDD) 40, an external communication interface (I/F) 50, a control panel 60, an image density sensor 70 as an image density detector, and a printer engine 100 as an image forming device. A system bus 80 interconnects the above-described elements.

The CPU 10 controls operations of the image forming apparatus 1. Specifically, the CPU 10 executes programs stored in the ROM 20 or the HDD 40, using the RAM 30 as a work area to control the operations of the entire image forming apparatus 1 and implement various functions, such as copying, scanning, faxing, and printing.

The ROM 20 is a nonvolatile semiconductor memory that can retain data even when a power source is turned off. The RAM 30 is a volatile semiconductor memory that temporarily stores a program or data. The HDD 40 is a nonvolatile memory that stores programs or data. The programs and data stored in the HDD 40 include an operating system (OS) which is basic software for controlling the entire image forming apparatus 1, various application programs operating on the OS, and setting data to set operation conditions of the above-described various functions, such as copying, scanning, faxing, and printing.

The external communication I/F 50 is an interface to connect the image forming apparatus 1 to a network, such as the Internet or a local area network (LAN). The image forming apparatus 1 can receive a print instruction, image data, and the like from external devices via the external communication I/F 50.

The control panel 60 receives various types of input according to the user's operation and displays various types of information (for example, information indicating the received operation, information indicating the operation status of the image forming apparatus 1, or information indicating the setting status of the image forming apparatus 1). The control panel 60 includes, but is not limited to, for example, a liquid crystal display (LCD) functioning as a touch panel. For example, the control panel 60 may include an organic electroluminescence (EL) display functioning as the touch panel. In addition to or instead of the above-described control panel 60, an operation device such as a hardware key or a display device such as a lamp may be provided. The control panel 60 is controlled by the CPU 10.

The printer engine 100 is hardware to perform image formation. As an image formation method, any method, such as an electrophotographic method or an inkjet method, can be employed. The printer engine 100 is controlled by the CPU 10.

The image forming apparatus 1 can further include a certain option such as a finisher to sort printed sheets (recording media) or an auto document feeder (ADF) to automatically feed a document.

The image forming apparatus 1 may further include an external interface, and read from and write to an external storage medium such as a compact disc (CD), a digital versatile disc (DVD), a secure digital (SD) memory card, or a universal serial bus (USB) memory via the external interface.

The programs stored in the ROM 20 or the HDD 40 can be processed by a computer. The programs may be installed in the ROM 20 or the HDD 40 at the time of manufacture or shipment of the image forming apparatus 1 or may be installed after sale. As a method of installing after sale, the programs can be installed via an external storage medium drive using an external storage medium storing the programs or via the network using the external communication I/F 50.

Figure 2:
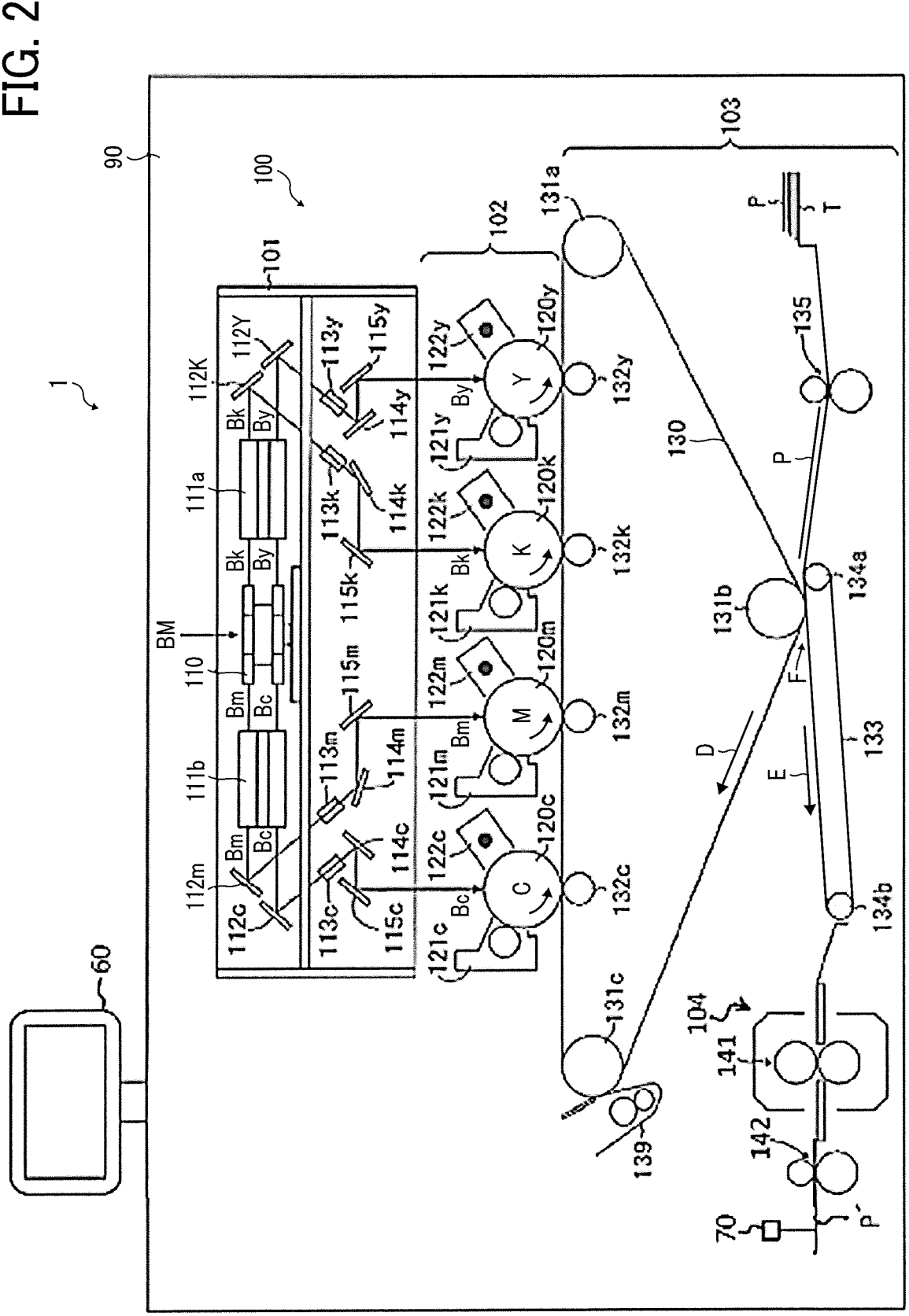
FIG. 2 is a schematic view illustrating a hardware configuration of a printer engine of the image forming apparatus according to embodiments of the present disclosure.

FIG. 2 is a schematic view illustrating a hardware configuration of the printer engine 100. The control panel 60 and the image density sensor 70 are also illustrated for the sake of explanation.

The printer engine 100 is disposed inside a housing 90 of the image forming apparatus 1 and includes an exposure device 101, an image forming unit 102, a transfer device 103, and a fixing device 104. The control panel 60 is disposed on the housing 90.

The image forming unit 102 includes a photoconductor 120y for yellow (Y), a photoconductor 120k for black (K), a photoconductor 120m for magenta (M), and a photoconductor 120c for cyan (C) as latent image bearers (hereinafter, also collectively referred to as "the photoconductors 120y to 120c"). The image forming unit 102 also includes a developing device 121y for yellow (Y), a developing device 121k for black (K), a developing device 121m for magenta (M), and a developing device 121c for cyan (C). The image forming unit 102 further includes a charger 122y for yellow (Y), a charger 122k for black (K), a charger 122m for magenta (M), and a charger 122c for cyan (C) as charging devices.

The transfer device 103 includes an intermediate transfer belt 130 as an intermediate transferor and a secondary transfer belt 133. The fixing device 104 includes a fixing member 141, an output roller pair 142, and the like.

A description is provided below of an operation of the printer engine 100 with reference to FIG. 2.

The exposure device 101 emits writing light for writing latent images corresponding to image data on the photoconductors 120y to 120c of the image forming unit 102 and exposes the photoconductors 120y to 120c. That is, a light beam BM with the intensity corresponding to an image density of the image data is selectively emitted at the writing position corresponding to image patterns of the image data. Light from a laser light source or a light emitting diode (LED) light source can be used as the writing light. The following description is provided of an example using a laser light source including a laser diode (LD).

First, the light beam BM emitted from the laser light source is deflected by a polygon mirror 110 and enters scanning lenses 111a and 111b each including an fθ lens.

The configuration and operation in which the light beam BM is emitted from the laser light source are described later.

The light beams BM are generated corresponding to images of respective colors of yellow (Y), black (K), magenta (M), and cyan (C) in number and reflected by reflection mirrors 112y, 112K, 112M, and 112c after passing through the scanning lenses 111a and 111b. For example, a light beam By for yellow passes through the scanning lens 111a, is reflected by the reflection mirror 112y, and enters a long toroidal (WTL) lens 113y. The light beams Bk, Bm, and Bc of the respective colors of black, magenta, and cyan are directed similarly to the light beam By for yellow, and thus the description thereof is omitted.

WTL lenses 113y, 113k, 113m, and 113c shape the incident light beams By, Bk, Bm, and Bc (hereinafter, also collectively referred to as "the light beams By to Bc"), respectively, and then deflect the light beams By to Bc to the reflection mirrors 114y, 114k, 114m, and 114c. The respective light beams By to Bc are further reflected by reflection mirrors 115y, 115k, 115m, and 115c and guided to irradiate the photoconductors 120y to 120c as the writing lights used for exposure. The irradiation of the light beams By to Bc onto the photoconductors 120y to 120c is synchronized in timing with respect to the main-scanning direction and the sub-scanning direction on the photoconductors 120y to 120c. Hereinafter, the main-scanning direction on the photoconductors 120y to 120c is defined as the scanning direction of the light beams By to Bc, and the sub-scanning direction is defined as the direction perpendicular to the main-scanning direction, that is, the direction of rotation of the photoconductors 120y to 120c.

The photoconductors 120y to 120c are, for example, shaped like a drum that is long in the main-scanning direction and may be referred to as a photoconductor drum. The photoconductors 120y to 120c according to the present embodiment include a photoconductive layer including at least a charge generation layer and a charge transport layer on a conductive drum made of aluminum or the like. The respective photoconductive layers of the photoconductors 120y to 120c are charged by the chargers 122y, 122k, 122m, and 122c, each of which includes a corotron charger, a scorotron charger, a charging roller, or the like. Thus, the photoconductors 120y to 120c gain surface charges according to charging biases.

Surfaces of the photoconductors 120y to 120c which have been charged to predetermined potentials by the respective chargers 122y, 122k, 122m, and 122c are exposed by the light beams By to Bc as the writing lights in accordance with the image patterns, respectively. As a result, the potentials on the surfaces change at the exposed portion, thereby forming electrostatic latent images. The electrostatic latent images formed on the surfaces of the photoconductors 120y to 120c are developed by the developing devices 121y, 121k, 121m, and 121c into toner images, respectively. Each of the developing devices 121y, 121k, 121m, and 121c includes a developing sleeve to which a developing bias is applied, a toner supply roller, and a regulation blade.

The respective toner images carried on the photoconductors 120y to 120c are transferred and superimposed onto the intermediate transfer belt 130 as an image bearer rotating in the direction indicated by arrow D in FIG. 2 by conveyance rollers 131a, 131b, and 131c, thereby forming a multicolor toner image. Primary transfer rollers 132y, 132k, 132m, and 132c are disposed opposite the photoconductors 120y to 120c, respectively, and support the intermediate transfer belt 130. The toner images are transferred from the surfaces of the photoconductors 120y to 120c onto the intermediate transfer belt 130. The intermediate transfer belt 130, onto which the yellow, black, magenta, and cyan toner images are transferred from the surfaces of the photoconductors 120y to 120c, is conveyed to a secondary transfer position F.

The secondary transfer belt 133 is wound around conveyance rollers 134a and 134b and rotated in the direction indicated by arrow E in FIG. 2 by the conveyance rollers 134a and 134b. At the secondary transfer position F, a sheet P is fed from a sheet container T such as a sheet feeding tray by a registration roller pair 135. The sheet P is a recording medium, such as fine paper or a plastic sheet, to receive an image. At the secondary transfer position F, with application of a secondary transfer bias, the multicolor toner image borne on the intermediate transfer belt 130 is transferred onto the sheet P attracted and carried onto the secondary transfer belt 133. The sheet P is conveyed in the direction perpendicular to the main-scanning direction (i.e., the sub-scanning direction or a direction of conveyance of the sheet P).

The sheet P is fed to the fixing device 104 as the secondary transfer belt 133 rotates. The fixing device 104 includes the fixing member 141 such as a fixing roller including silicon rubber or fluoro-rubber. The multicolor toner image is fixed onto the sheet P under heat and pressure applied by the fixing device 104. Then, a sheet P' bearing the multicolor toner image is ejected outside the fixing device 104 by the output roller pair 142.

The image density of the image on the sheet P' ejected from the fixing device 104 is detected by the image density sensor 70. Although detailed descriptions of the image density sensor 70 are deferred, it is to be noted here that an image density deviation in the main-scanning direction is corrected based on the image density detected by the image density sensor 70.

After the multicolor toner image is transferred from the intermediate transfer belt 130, a cleaning device 139 including a cleaning blade removes residual toner from the intermediate transfer belt 130. Then, the intermediate transfer belt 130 is used in a next image forming process.

In the above-described operation of the printer engine 100, the direction of rotation of the photoconductors 120y to 120c, the direction of movement of the intermediate transfer belt 130, and the direction of conveyance of the sheet P and the sheet P' (hereinafter referred to as "sheet conveyance direction") are all perpendicular to the main-scanning direction and the same as the sub-scanning direction.

In FIG. 2, the image density sensor 70 is disposed downstream from the fixing device 104 in the sheet conveyance direction. Alternatively, the image density sensor 70 can be disposed, for example, in the vicinity of the conveyance roller 131a so that the image density sensor 70 can detect the image density of images on the intermediate transfer belt 130.

Figure 3:
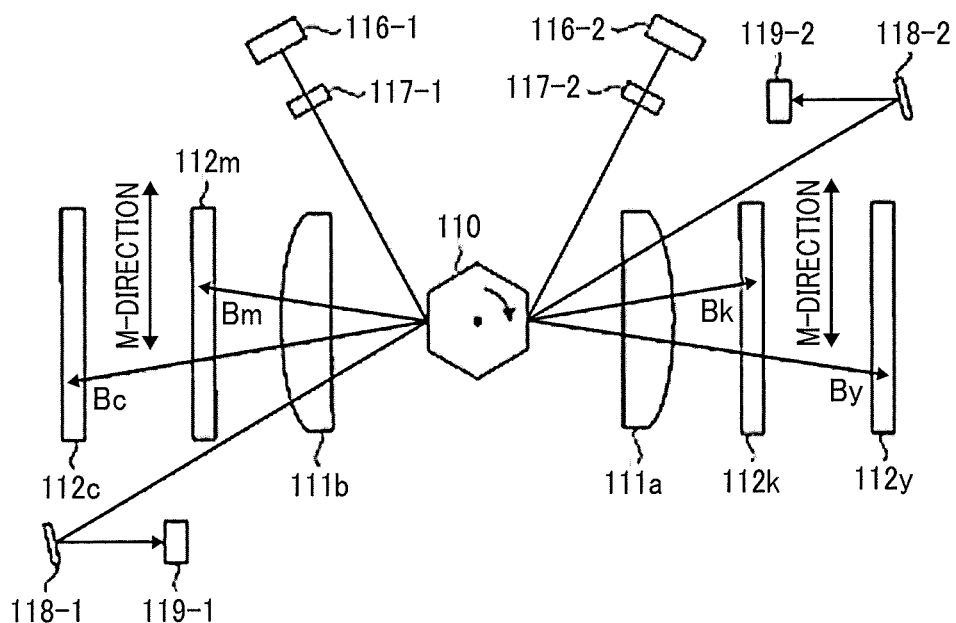
FIG. 3 is a schematic view of a light source unit of an exposure device of the image forming apparatus according to embodiments of the present disclosure.

FIG. 3 is a schematic view of a light source unit of the exposure device 101.

The exposure device 101 includes LD units 116-1 and 116-2 as light source units. Each of the LD units 116-1 and 116-2 includes laser elements. Each laser element is driven to selectively emit a light beam at a writing position corresponding to image data with the intensity of the writing light corresponding to the image data.

The light beam emitted from the LD unit 116-1 passes through a cylinder lens 117-1 and is directed to the polygon mirror 110 rotated by a polygon motor. An upper portion and a lower portion of the LD unit 116-1 include an upper LD and a lower LD, respectively. For example, the light beam Bm for magenta is emitted from the upper LD and directed to the upper portion face of the polygon mirror 110, and the light beam Bc for cyan emitted from the lower LD is directed to the lower portion face of the polygon mirror 110.

The light beam Bm for magenta directed to the upper portion face of the polygon mirror 110 is deflected as the polygon mirror 110 rotates. The deflected light beam Bm for magenta passes through the scanning lens 111*b* and enters the reflection mirror 112*m*. Then, the light beam Bm for magenta scans the photoconductor 120*m* as described with reference to FIG. 2. On the other hand, the light beam Bc for cyan directed to the lower portion face of the polygon mirror 110 is deflected as the polygon mirror 110 rotates. The deflected light beam Bc for cyan passes through the scanning lens 111*b* and enters the reflection mirror 112*c*. Then, the light beam Bc for cyan scans the photoconductor 120*c* as described above with reference to FIG. 2.

A synchronous mirror 118-1 and a synchronous sensor 119-1 are disposed in a non-image writing area, which is in an end portion on a writing start side in the main-scanning direction indicated by arrow M-DIRECTION in FIG. 3, and outward a writing start position in the main-scanning direction. The magenta and cyan light beams Bm and Bc passing through the scanning lens 111*b* are reflected by the synchronous mirror 118-1 and enters the synchronous sensor 119-1. The synchronous sensor 119-1 outputs synchronization detection signals for determining the timing of start of writing in the main-scanning direction of respective colors as the magenta and yellow light beams Bm and Bc enter the synchronous sensor 119-1.

The light beam emitted from the LD unit 116-2 passes through a cylinder lens 117-2 and is directed to the polygon mirror 110 rotated by the polygon motor. An upper portion and a lower portion of the LD unit 116-2 include an upper LD and a lower LD, respectively. For example, the light beam Bk for black is emitted from the upper LD and directed to the upper portion face of the polygon mirror 110, and the light beam By for yellow emitted from the lower LD is directed to the lower portion face of the polygon mirror 110.

The light beam Bk for black directed to the upper portion face of the polygon mirror 110 is deflected as the polygon mirror 110 rotates. The deflected light beam Bk for black passes through the scanning lens 111*a* and enters the reflection mirror 112*k*. Then, the light beam Bk for black scans the photoconductor 120*k* as described with reference to FIG. 2. On the other hand, the light beam By for yellow directed to the lower portion face of the polygon mirror 110 is deflected as the polygon mirror 110 rotates. The deflected light beam By for yellow passes through the scanning lens 111*a* and enters the reflection mirror 112*y*. Then, the light beam By for yellow scans the photoconductor 120*y* as described with reference to FIG. 2.

A synchronous mirror 118-2 and a synchronous sensor 119-2 are disposed in a non-image writing area, which is in an end portion on a writing start side in the main-scanning direction, and outward a writing start position in the main-scanning direction. The black and yellow light beams Bk and By passing through the scanning lens 111*a* are reflected by the synchronous mirror 118-2 and enters the synchronous sensor 119-2. The synchronous sensor 119-2 outputs synchronization detection signals for determining the timing of start of writing in the main-scanning direction of respective colors as the black and yellow light beams Bk and By enter the synchronous sensor 119-2.

Next, the configuration of the image density sensor 70 is described with reference to FIG. 4.

Figure 4:
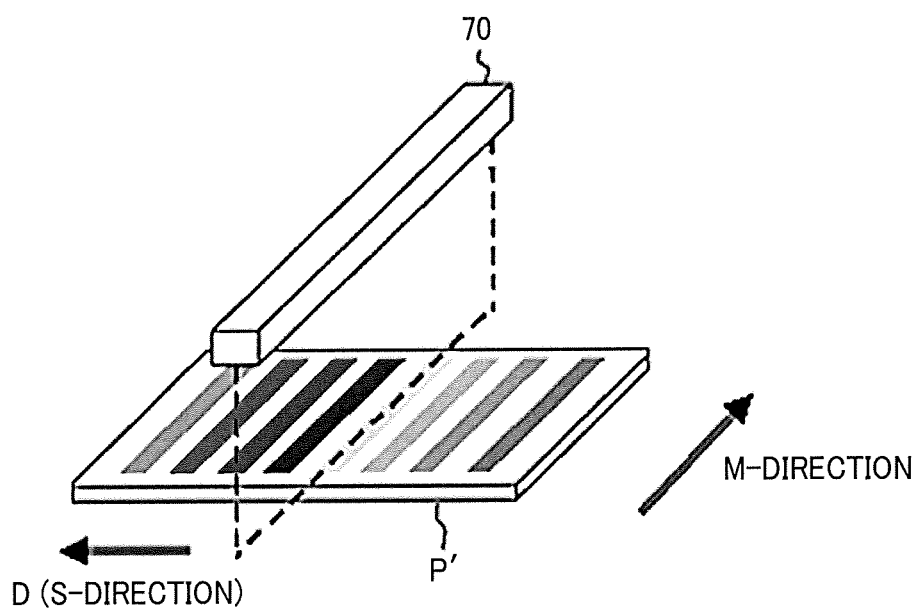
FIG. 4 is a perspective view of an image density sensor of the image forming apparatus according to embodiments of the present disclosure.

FIG. 4 is a perspective view of the image density sensor 70.

The image density sensor 70 has its long axis extending in the main-scanning direction. The image density sensor 70 includes an image sensor 71 that also has its long axis in the main-scanning direction and is sometimes called a line sensor. A detection width of the image density sensor 70 in the main-scanning direction is indicated by the broken line in the main-scanning direction in FIG. 4. The detection width is wider than the width of the sheet P' in the main-scanning direction. Accordingly, as the sheet P' is conveyed so as to pass through the detection width indicated by the broken line in the main-scanning direction, the image density can be detected over the entire area of the sheet P'.

As illustrated in FIG. 4, the image density sensor 70 can detect the image density over the entire area of the sheet P' in the main-scanning direction. Alternatively, an image density sensor may detect a part of the sheet P' if image formation conditions can be corrected so as to reduce the image density deviation in the main-scanning direction based on the detection result of the image densities of a plurality of areas divided in the main-scanning direction. For example, a plurality of sensors may be intermittently arranged in the main-scanning direction of the sheet P'.

In the present embodiment, the image formation condition is corrected to reduce the image density deviation in the main-scanning direction. However, similarly, the image formation condition can be corrected to reduce the image density deviation in the sub-scanning direction (S-DIRECTION in FIG. 4). In this case, the image formation condition is corrected based on the detection result of the image densities of a plurality of areas divided in the sub-scanning direction (i.e., the sheet conveyance direction D) so as to reduce the image density deviation in the sub-scanning direction. At that time, an image density sensor that can detect the image densities at a plurality of points in the sub-scanning direction (i.e., the sheet conveyance direction D) of the sheet is used.

In the present embodiment, the image density sensor 70 detects the image density of the image fixed on the sheet P' after the fixing process, but the position where the image density sensor 70 detects the image density is not limited thereto. For example, an image density sensor may detect an image density of an unfixed image formed on a sheet before the fixing process or an image density (or a toner adhesion amount) of an image primarily transferred onto the intermediate transfer belt 130.

Figure 5:
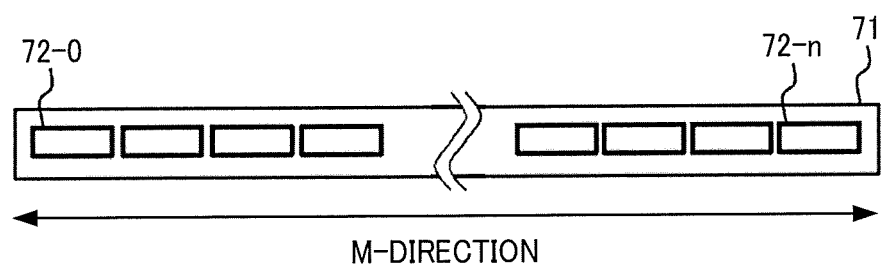
FIG. 5 is a schematic view of an image sensor included in the image density sensor in FIG. 4.

FIG. 5 is a schematic view of the image sensor 71 included in the image density sensor 70.

As illustrated in FIG. 5, the image sensor 71 extends in the main-scanning direction and includes small light-receiving elements 72-0 to 72-*n* (hereinafter collectively referred to as "light-receiving elements 72" when discrimination is not necessary) arranged side by side in the main-scanning direction. The range over which the light-receiving elements 72 are arranged is the above-described detection width of the image density sensor 70 in the main-scanning direction.

Figure 6:
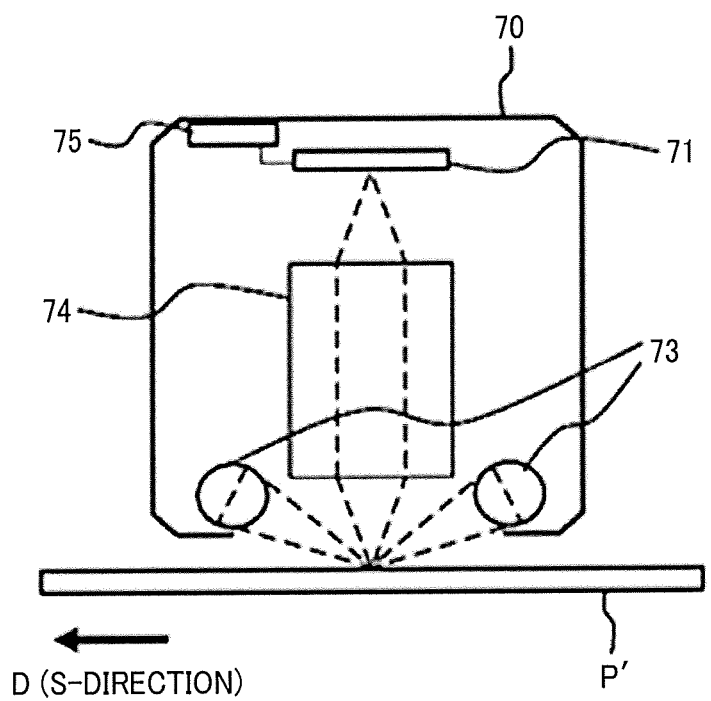
FIG. 6 is a schematic view illustrating an inner configuration of the image density sensor as viewed along the main-scanning direction.

FIG. 6 is a schematic view illustrating an internal configuration of the image density sensor 70 as viewed along the main-scanning direction.

As illustrated in FIG. 6, the image density sensor 70 includes the above-described image sensor 71, light sources 73, a lens array 74, and an output circuit 75. The broken lines in FIG. 6 represent light emitted from the light sources 73.

As each of the light sources 73, for example, a light-emitting element disposed at an end of a light guide or an LED array can be used. The light emitted from the light source 73 is reflected onto the sheet P' and focused on the image sensor 71 by the lens array 74. The image sensor 71 receives, with the light-receiving elements 72 illustrated in FIG. 5, the light focused by the lens array 74 and outputs a signal corresponding to the received light intensity. A complementary metal oxide semiconductor (CMOS) sensor or a charge-coupled device (CCD) sensor, for example, may be used as the image sensor 71.

Based on the signal from each light-receiving element 72 on the image sensor 71, the output circuit 75 outputs data indicating the image density corresponding to the position in the main-scanning direction of the image formed on the sheet P'. The output signal is, for example, image density data of 0 to 255 gradations expressed in units of 8 bits. The output circuit 75 can be, for example, an application specific integrated circuit (ASIC) or the like.

Figure 7:
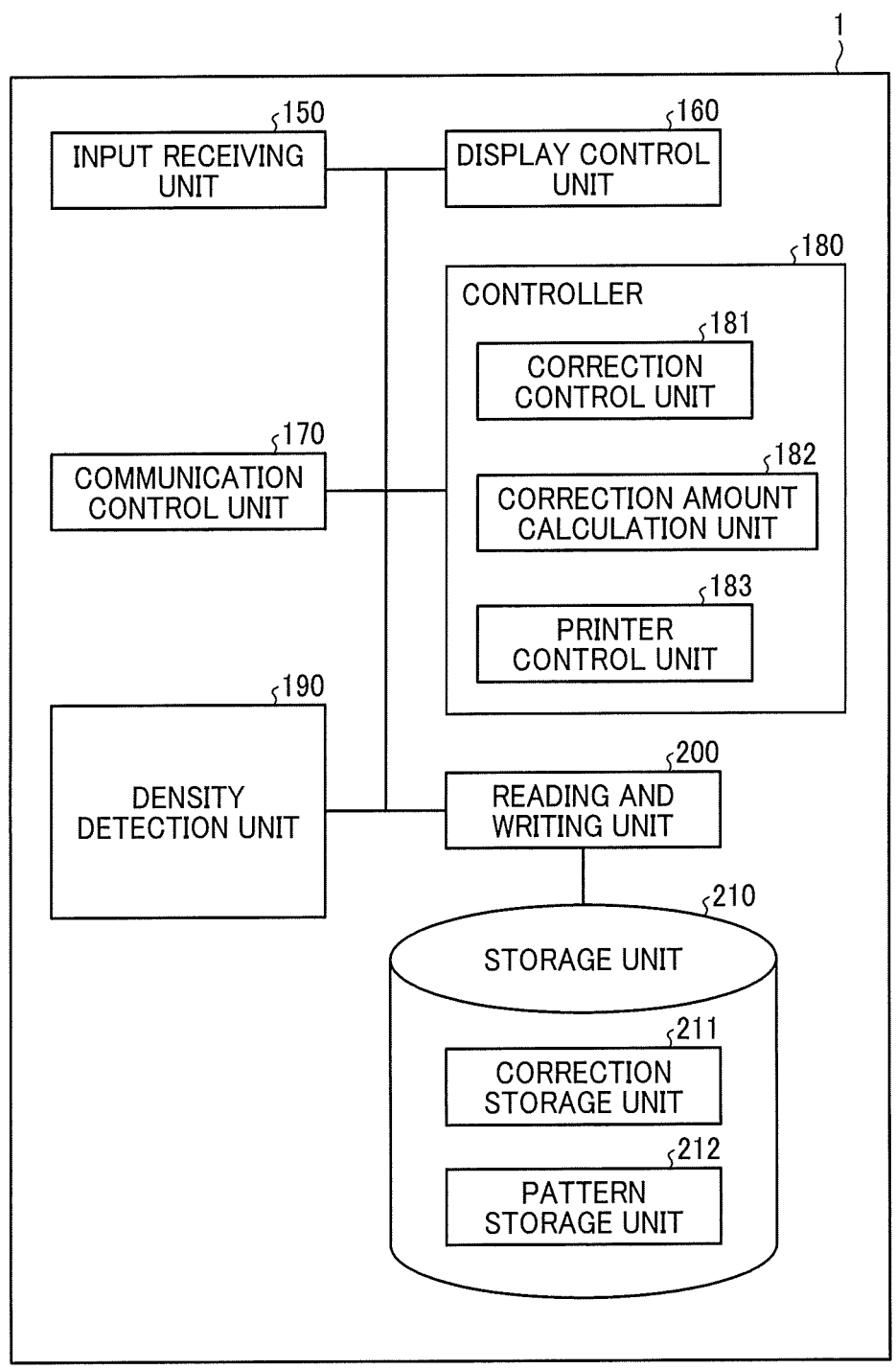
FIG. 7 is a functional block diagram of the image forming apparatus according to embodiments of the present disclosure.

FIG. 7 is a functional block diagram of the image forming apparatus 1.

An input receiving unit 150 is implemented by the control panel 60. The input receiving unit 150 is configured to display information necessary for operation to a user and accept various inputs made by the user. The input receiving unit 150 is also implemented by the processing of the external communication I/F 50 and accepts a print instruction or setting change by a user, input from an external device via the LAN or the Internet.

A display control unit 160 is implemented by the CPU 10 executing a program stored in the ROM 20 or the HDD 40, using the RAM 30 as the work area. The display control unit 160 controls a display screen to be displayed on the input receiving unit 150.

A communication control unit 170 is implemented by the processing of the external communication I/F 50. To transmit via email the image data to the outside or accept various types of setting data from an external device, the communication control unit 170 communicates with the external device via the network.

A controller 180 is implemented by the CPU 10 executing a program stored in the ROM 20 or the HDD 40, using the RAM 30 as the work area and performs the function of the entire image forming apparatus 1, such as copying, scanning, printing, and faxing functions. The controller 180 includes a correction control unit 181, a correction amount calculation unit 182, and a printer control unit 183. The correction control unit 181 controls correction of image density deviation in the printing function. The correction amount calculation unit 182 calculates an amount of correction by which the image formation condition is to be corrected (i.e., correction amount), for correcting the image density deviation (i.e., uneven density). The printer control unit 183 controls, in particular, the printer engine 100. Detailed descriptions of the correction control unit 181, the correction amount calculation unit 182, and the printer control unit 183 are deferred.

A density detection unit 190 including the image density sensor 70 detects the image density of a density correction pattern as a correction image formed by the printer engine 100 and outputs the detection result.

A reading and writing unit 200 is implemented by the CPU 10 executing a program stored in the ROM 20 or the HDD 40, using the RAM 30 as the work area. The reading and writing unit 200 stores various types of data in a storage unit 210 and retrieves the data stored therein.

The storage unit 210 includes the ROM 20 and the HDD 40 to store programs, data, various setting data regarding the image formation conditions necessary for the operation of the image forming apparatus 1, and operation logs of the image forming apparatus 1. Examples of the image formation conditions include a charging bias, a developing bias, the intensity of optical writing light, and a transfer bias. The storage unit 210 includes a correction storage unit 211 and a pattern storage unit 212. The correction storage unit 211 stores correction contents of the various image formation conditions.

Various data stored in the storage unit 210 can be set before shipment of the image forming apparatus 1 or can be updated after shipment. Depending on the data to be stored, the storage unit 210 can be implemented by the temporary storage function of the RAM 30.

Figure 8:
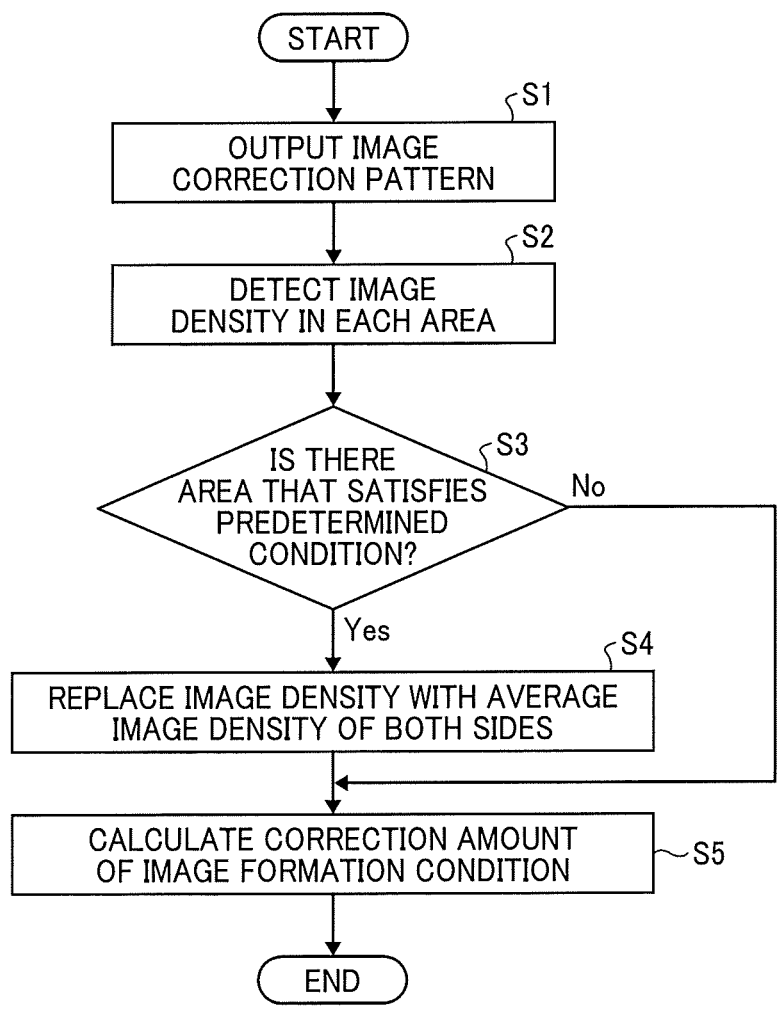
FIG. 8 is a flowchart illustrating correction processing executed in the image forming apparatus to correct an image density deviation according to a first embodiment of the present disclosure.

FIG. 8 is a flowchart illustrating correction processing executed in the image forming apparatus 1 to correct the image density deviation according to a first embodiment of the present disclosure.

When receiving a command to correct the image density deviation, the controller 180 of the image forming apparatus 1 outputs the density correction pattern as the correction image (S1). The image density sensor 70 detects the density correction pattern (S2), and the controller 180 acquires data of the detected image density in each area of the density correction pattern in the main-scanning direction. Then, the controller 180 determines whether a predetermined replacement execution condition is satisfied for each area in which the image density data is acquired in the main-scanning direction (S3).

In general, when the image density sensor 70 is normal, an image density difference between adjacent areas in the main-scanning direction is within a certain range. However, when the image density sensor 70 becomes abnormal, the image density difference between the adjacent areas in the main-scanning direction may exceed the certain range. That is, an area having an outlier may be generated. This outlier may be caused, for example, by foreign substances adhering to a portion of the image density sensor 70 corresponding to the area.

At that time, if the correction amount of the image formation condition is calculated using the detected image density including the outlier, an abnormal image occurs, such as a black line having a darker image density or a white line having a lower image density than the image density of the surrounding areas, at the position in the main-scanning direction corresponding to the area having the outlier.

Therefore, in the first embodiment, each area in the main-scanning direction is sequentially focused on as an area of interest. When the difference between the detected image density of the area of interest and the detected image density of the adjacent area adjacent to the area of interest exceeds a predetermined threshold, the controller 180 determines that the area of interest satisfies the predetermined replacement execution condition in step S3. As a result, the controller 180 specifies an area having an outlier due to the abnormality of the image density sensor 70.

When the controller 180 determines that there is no area of interest satisfying the predetermined replacement execution condition (No in step S3), the process proceeds to step S5. The controller 180 uses the detected image density of each area detected in step S2 as it is, and calculates the correction amount of image formation condition (S5) therefrom.

On the other hand, when the controller 180 determines that there is an area of interest satisfying the predetermined replacement execution condition in step S3 (Yes in step S3), the controller 180 executes replacement processing to replace the detected image density of the corresponding area of interest satisfying the predetermined replacement execution condition with an average value of the detected image densities of two adjacent areas adjacent to the corresponding area of interest on both sides (S4). Then, the controller 180 uses the value obtained by replacing the image density of the corresponding area of interest satisfying the predetermined replacement execution condition with the average value for the area of interest and uses the detected image density detected in step S2 as it is for the other areas to calculate the correction amount of the image formation condition (S5).

It is possible that image density according to the image data is not attained and an image density deviation not desired by the user occurs in the image, due to variations in the shape and properties of components of the image forming apparatus 1, changes over time, changes in the environment where the image forming apparatus 1 is installed, and the like. In the correction processing to correct the image density deviation according to the present embodiment, to correct such image density deviations, the density correction pattern is formed using image data having a constant image density in the main-scanning direction and the image density sensor 70 detects the image density of each area in the main-scanning direction. If the image density deviation occurs in the respective areas, various image formation conditions are corrected so that the image density deviation is eliminated.

In the present embodiment, for example, the LD power of the exposure device 101 (i.e., the exposure power of the writing light) is corrected as the image formation condition. In this case, when the image density deviation in the main-scanning direction is detected, the controller 180 calculates the correction amount of the LD power to correct the setting value of the LD power at each writing position in the main-scanning direction so that the image density deviation is eliminated.

Figure 9:
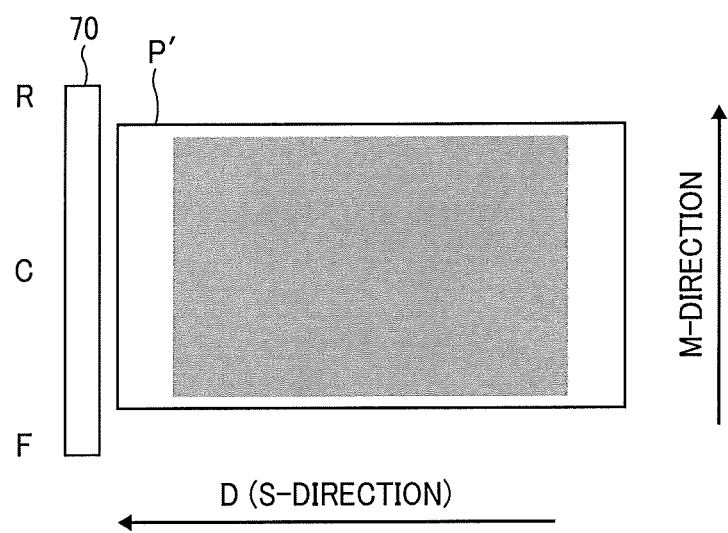
FIG. 9 is a schematic view illustrating an example of a density correction pattern used in the image forming apparatus according to embodiments of the present disclosure.

FIG. 9 is a schematic view illustrating an example of the density correction pattern.

R, C, and F in FIG. 9 indicate positions in the main-scanning direction (i.e., depth direction) of the image forming apparatus 1. That is, R indicates the rear side of the image forming apparatus 1 in the main-scanning direction, C indicates the central portion, and F indicates the front side. The front side of the image forming apparatus 1 is, for example, a side where a user operates the control panel 60.

FIG. 9 illustrates that, for example, one density correction pattern is formed on the sheet P' according to the image data with single color and single image density. However, the density correction pattern is not limited to the above example. For example, a plurality of density correction patterns of different colors may be formed on one sheet, or a plurality of density correction patterns of different image densities may be formed in a single color.

Figure 10A:
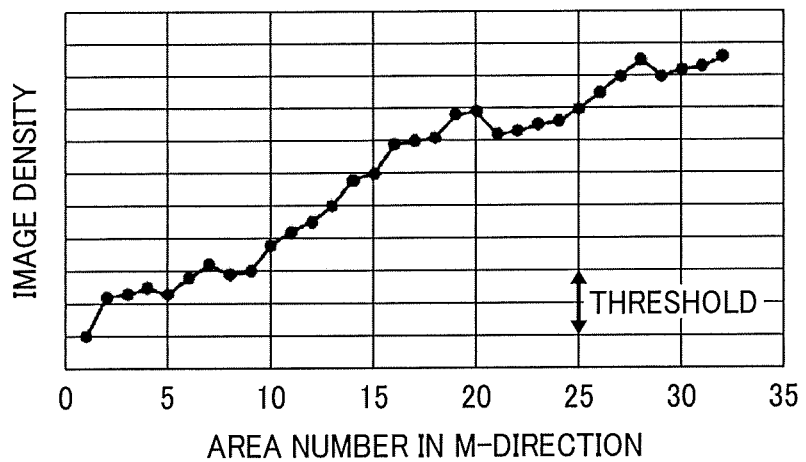
FIG. 10A is a graph illustrating an example of a normal detection result obtained by detecting the density correction pattern by the image density sensor.

FIG. 10A is a graph illustrating an example of a normal detection result obtained by detecting the density correction pattern by the image density sensor 70.

Figure 10B:
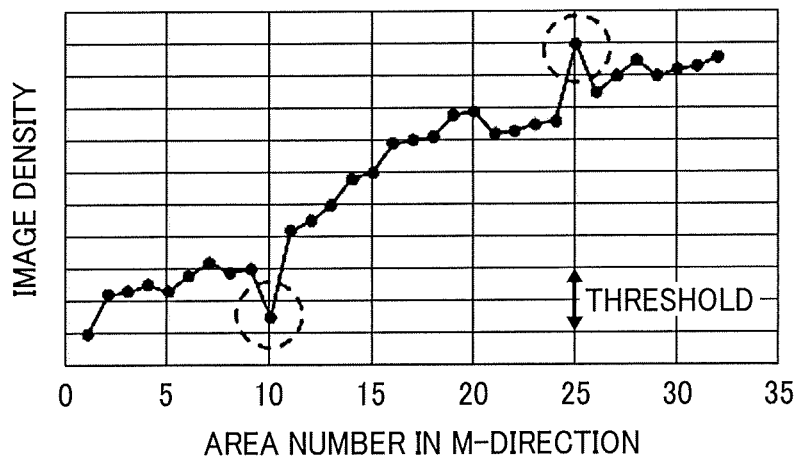
FIG. 10B is a graph illustrating an example of an abnormal detection result obtained by detecting the density correction pattern by the image density sensor.

FIG. 10B is a graph illustrating an example of an abnormal detection result obtained by detecting the density correction pattern by the image density sensor 70.

Figure 10C:
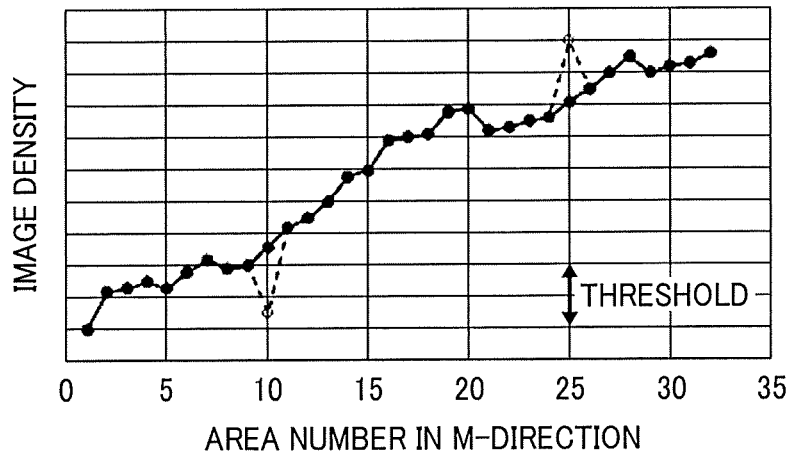
FIG. 10C is a graph after outliers in the abnormal detection result in FIG. 10B are replaced by replacement processing.

FIG. 10C is a graph after outliers in the abnormal detection result in FIG. 10B are replaced by the above-described replacement processing.

In FIGS. 10A, 10B, and 10C, the horizontal axis indicates a position of each area when the density correction pattern is divided into 32 areas along the main-scanning direction, and the vertical axis represents the image density of each area. In the first embodiment, the area number 1 indicates an area located on the front side of the image forming apparatus 1, and the area number 32 is an area located on the rear side of the image forming apparatus 1. Hereinafter, data of the image density as illustrated in graphs in FIGS. 10A, 10B, and 10C is referred to as an image density profile.

FIG. 10A illustrates the image density profile when the image density sensor 70 is normal. In this normal image density profile, the difference in image density between adjacent areas is less than or equal to the predetermined threshold. Therefore, the difference in image density does not satisfy the above-described predetermined replacement execution condition. As a result, the correction amount of the image formation condition is calculated based on the image density profile in which the detected image density detected by the image density sensor 70 is used as it is.

FIG. 10B illustrates the image density profile in which the same density correction pattern as that of FIG. 10A is detected when the image density sensor 70 is abnormal. Specifically, the areas of the area number 10 and the area number 25 have outliers in which the image density changes abruptly. This outlier is caused by, for example, foreign substances adhering to a portion of the image density sensor 70 corresponding to the area.

At that time, if the correction amount of the image formation condition is calculated from the image density profile in which the detected image density is used as it is across the entire area including the area number 10 and the area number 25, as described above, the image density corresponding to the area number 10 in the main-scanning direction is higher than the target image density due to the correction amount of the image formation condition corresponding to the area number 10 in the main-scanning direction. Similarly, with respect to the position in the main-scanning direction corresponding to the area number 25, the image density is corrected so as to be lower than the target image density. As a result, the black line as the abnormal image is generated at the position in the main-scanning direction corresponding to the area number 10, and the white line as the abnormal image is generated at the position in the main-scanning direction corresponding to the area number 25.

FIG. 10C illustrates an image density profile in which the image densities of the areas of area numbers 10 and 25 having outliers as illustrated in FIG. 10B are replaced using the average value of the detected image densities of the two adjacent areas located on both sides of the area of the area numbers 10 and 25 by the above-described replacement processing. In the first embodiment, the detected image density which has the outlier is not used as the image density of the area of the area numbers 10 and 25 indicating the above-described outlier, that is, the corrected image density is used. As a result, an abnormal image such as the black line and the white line due to the outlier can be prevented.

Thus, the image density of the area of interest used for calculation of the correction amount of the image formation condition becomes an intermediate value of the detected image densities of the two adjacent areas located on both sides of the area of interest. As illustrated in FIG. 10C, an image density profile is acquired in which the image density does not abruptly change in the area of the area numbers 10 and 25. As a result, the image density deviation in the area of interest is minimized, and high quality images can be obtained even if the replacement processing for replacing the image density in the area of interest is executed.

Figure 11B:
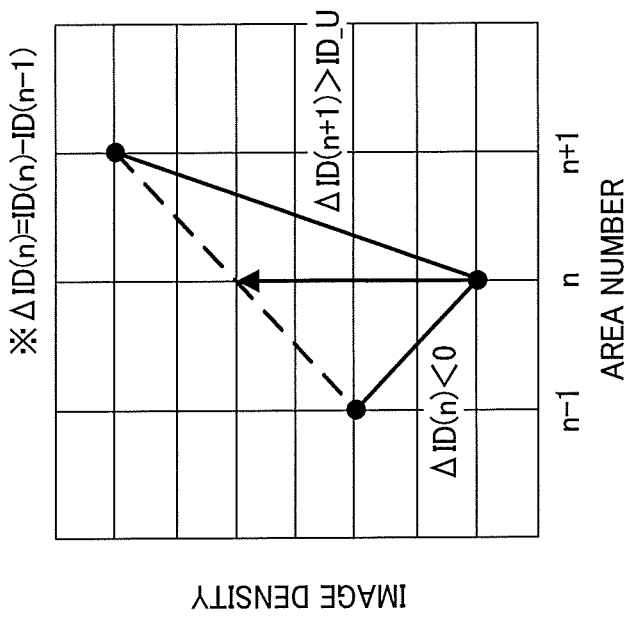
FIGS. 11A and 11B are graphs illustrating examples of replacement execution conditions and the replacement processing when the replacement execution conditions are satisfied.
Figure 11A:
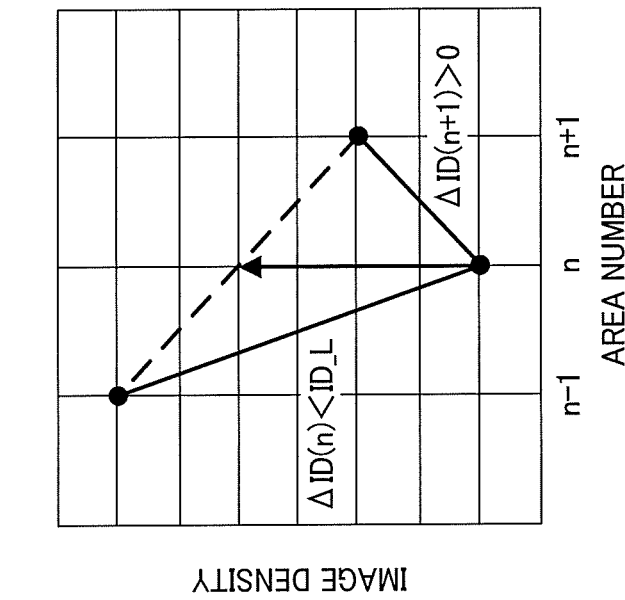

FIGS. 11A and 11B are graphs illustrating the above-described replacement execution conditions and the replacement processing when the replacement execution condition is satisfied.

When the area of interest is an area of the area number n, the detected image density of the area of interest is ID(n), and the detected image densities of the two adjacent areas adjacent to the area of interest are ID(n−1) and ID(n+1). The predetermined thresholds described above are ID_L and ID_U. At that time, in the first embodiment, when the following conditional expression, Expression 1 or Expression 2, is satisfied, the controller 180 determines that the area of interest satisfies the criteria for replacement and replaces the image density ID(n) of the area of interest with the average value of detected image densities ID (n−1) and ID (n+1) of the two adjacent areas located on both sides of the area of interest.

$$ID(n)-ID(n-1)<ID\_L \text{ and } ID(n+1)-ID(n)>0 \quad \text{Expression 1}$$

$$ID(n)-ID(n-1)<0 \text{ and } ID(n+1)\geq ID(n)>ID\_U \quad \text{Expression 2}$$

Note that $\Delta ID(x)$ represents $ID(x)-ID(x-1)$. With this expression, a conditional expression, Expression 1 described above, is modified to the following conditional expression, Expression 1', that matches the conditional expression illustrated in FIG. 11A. Similarly, the above-described conditional expression, Expression 2, is modified to the following conditional expression, Expression 2', which matches the conditional expression illustrated in FIG. 11B.

$$\Delta ID(n)<ID\_L \text{ and } \Delta ID(n+1)>0 \quad \text{Expression 1'}$$

$$\Delta ID(n)<0 \text{ and } \Delta ID(n+1)>ID\_U \quad \text{Expression 2'}$$

The controller 180 determines whether the area of interest satisfies the criteria for replacement by the above-described conditional expressions. If the detected image density of the area of interest is extremely low compared to at least one of the two adjacent areas located on both sides thereof (i.e., the difference between the detected image density of the area of interest and at least one of the detected image densities of the adjacent areas exceeds a predetermined threshold), the controller 180 determines that the detected image density of the area of interest is an outlier and replaces the outlier with the average value of the detected image densities of the two adjacent areas, thereby preventing the abnormal image such as the black line as described above.

Figure 12B:
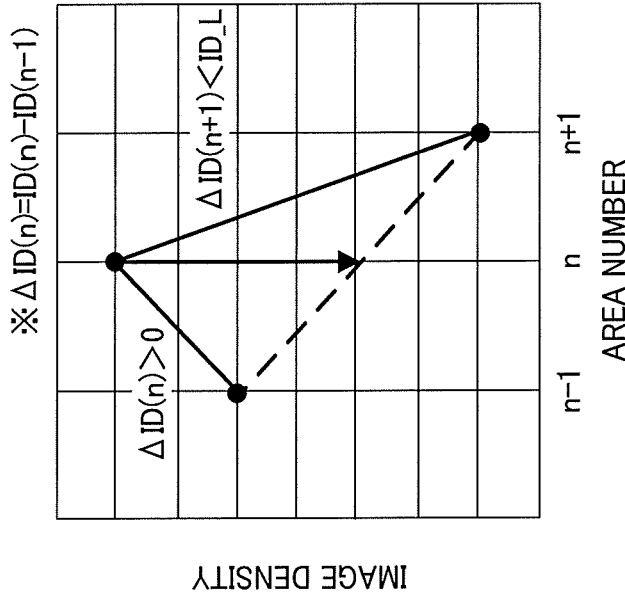
FIGS. 12A and 12B are graphs illustrating other examples of replacement execution conditions and the replacement processing when the replacement execution conditions are satisfied.
Figure 12A:
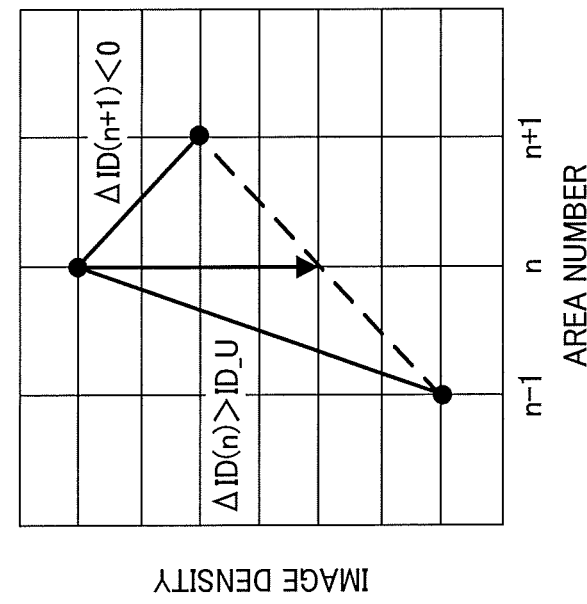

FIGS. 12A and 12B are graphs illustrating the above-described replacement execution conditions and the replacement processing when the replacement execution condition is satisfied.

In the first embodiment, when the following conditional expression, Expression 3 or Expression 4, is satisfied, the controller 180 determines that the area of interest satisfies the criteria for replacement and replaces the image density ID(n) of the area of interest with the average value of detected image densities ID(n−1) and ID(n+1) of the two adjacent areas located on both sides of the area of interest.

$$ID(n)-ID(n-1)>ID\_U \text{ and } ID(n+1)-ID(n)<0 \quad \text{Expression 3}$$

$$ID(n)-ID(n-1)>0 \text{ and } ID(n+1)-ID(n)<ID\_L \quad \text{Expression 4}$$

The above-described conditional expression, Expression 3, is modified to the following conditional expression, Expression 3', which matches the conditional expression illustrated in FIG. 12A. Similarly, the above-described conditional expression, Expression 4, is modified to the following conditional expression, Expression 4', which matches the conditional expression illustrated in FIG. 12B.

$$\Delta ID(n)>ID\_U \text{ and } \Delta ID(n+1)<0 \quad \text{Expression 3'}$$

$$\Delta ID(n)>0 \text{ and } \Delta ID(n+1)<ID\_L \quad \text{Expression 4'}$$

The controller 180 determines whether the area of interest satisfies the criteria for replacement by the above-described conditional expressions. If the detected image density of the area of interest is extremely high compared to at least one of the two adjacent areas located on both sides thereof (i.e., the difference between the detected image density of the area of interest and at least one of the detected image densities of the adjacent areas exceeds a predetermined threshold), the controller 180 determines that the detected image density of the area of interest is an outlier and replace the outlier with the average value of the detected image densities of the two adjacent areas, thereby preventing the abnormal image such as the white line as described above.

In the first embodiment, the image density of the area of interest satisfying the replacement execution condition is replaced with the average value of the image densities of the two adjacent areas located on both sides of the area of interest. Alternatively, the image density of the area of interest can be replaced with the average value including the image densities of other areas if the average value includes the image densities of the two adjacent areas, thereby attaining the similar effect. For example, the image density may be replaced with the average value of the image densities of four or more areas in total that include two or more areas following both sides of the area of interest satisfying the replacement execution condition.

The above-described thresholds ID_L and ID_U may be fixed values predetermined at a certain level at which an abnormal image, such as the black line or the white line, is not recognized. Alternatively, the controller 180 may calculate thresholds ID_L and ID_U from a standard deviation of part or all of the detected image densities of respective areas detected in step S2. Specifically, the thresholds ID_L and ID_U are increased when the standard deviation is high, and the thresholds ID_L and ID_U are reduced when the standard deviation is low. In this manner in which the controller 180 calculates the thresholds ID_L and ID_U from the standard deviation, the area to be replaced whose image density is significantly different from that of the adjacent area can be appropriately specified according to the degree of deviation of the detected image density in the main-scanning direction.

Next, an image forming apparatus according to a second embodiment of the present disclosure is described.

In the replacement processing of the above-described first embodiment, the image density of the area of interest satisfying the predetermined replacement execution condition before calculation of the correction amount of the image formation condition is replaced. In the replacement processing of the second embodiment, the correction amount of the image formation condition of the area of interest satisfying the predetermined replacement execution condition is replaced. Descriptions are given below of the second embodiment, focusing on the differences from the above-described first embodiment, and similar description to the first embodiment is omitted.

Figure 13:
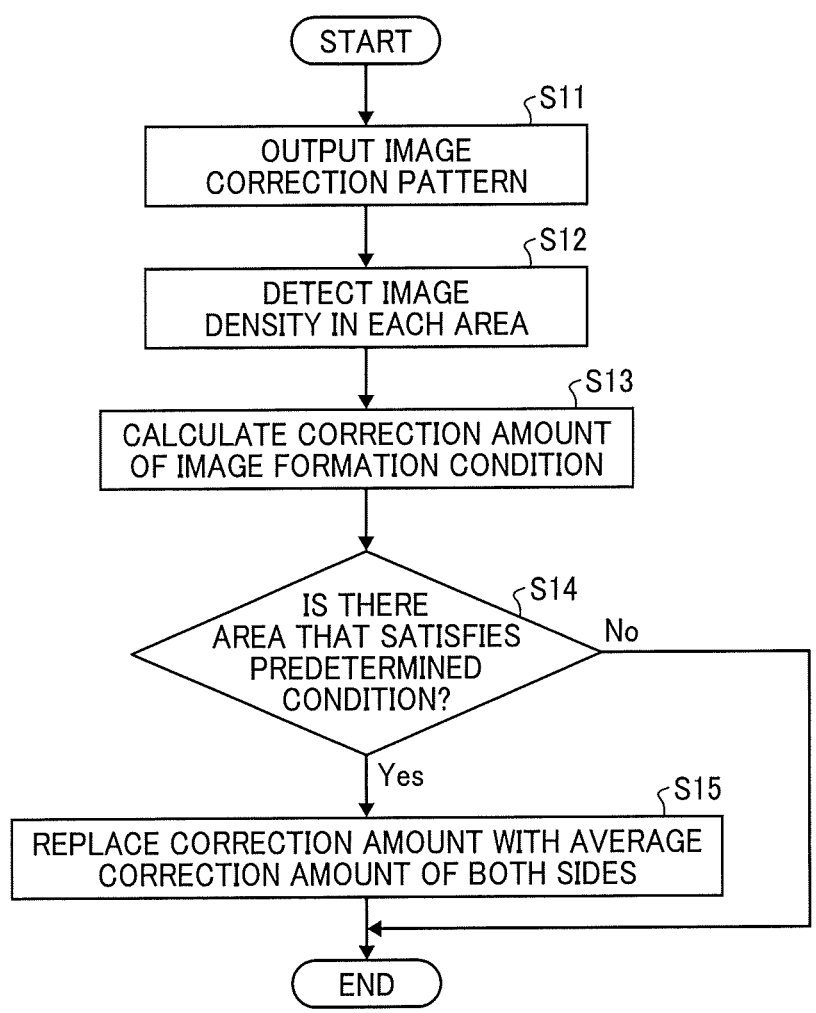
FIG. 13 is a flowchart illustrating correction processing executed in the image forming apparatus to correct the image density deviation according to a second embodiment of the present disclosure.

FIG. 13 is a flowchart illustrating correction processing executed in the image forming apparatus 1 to correct the image density deviation according to the second embodiment.

When receiving a command to correct the image density deviation, the controller 180 of the image forming apparatus 1 outputs the density correction pattern as the correction image (S11). The image density sensor 70 detects the density correction pattern (S12), and the controller 180 acquires data of the detected image density in each area of the density correction pattern in the main-scanning direction. Then, in the second embodiment, the controller 180 calculates the correction amount of the image formation condition by the detected image density of each area detected in step S12 as it is (S13).

Then, the controller 180 according to the second embodiment determines whether each area in which the correction amount is calculated in the main-scanning direction satisfies the predetermined replacement execution condition (S14). Specifically, in the second embodiment, each area in the main-scanning direction is sequentially focused on as the area of interest. When the difference between the calculated correction amount of the image formation condition of the area of interest and the calculated correction amount of the image formation condition of the adjacent area adjacent to the area of interest exceeds the predetermined threshold, the controller 180 determines that the area of interest satisfies the predetermined replacement execution condition in step S14. As a result, the controller 180 specifies an area having an outlier due to the abnormality of the image density sensor 70.

When the controller 180 determines that there is no area satisfying the predetermined replacement execution condition (No in step S14), the controller 180 uses the correction amount of the image formation condition of each area calculated in step S13 as it is. On the other hand, when the controller 180 determines that there is an area satisfying the predetermined replacement execution condition in step S14 (Yes in step S14), the controller 180 executes the replacement processing to replace the correction amount of the image formation condition of the corresponding area of interest satisfying the predetermined replacement execution condition with an average value of the correction amounts of the image formation condition of two adjacent areas adjacent to the corresponding area of interest on both sides (S15). Then, the controller 180 uses the value obtained by replacing the correction amount of the image formation condition with the average value for the area of interest satisfying the predetermined replacement execution condition and uses the correction amount of the image formation condition calculated in step S13 as it is for the other areas.

Figure 14A:
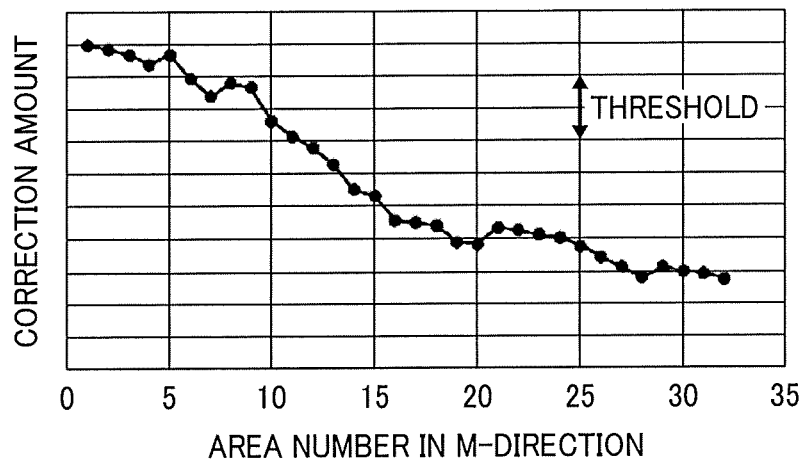
FIG. 14A is a graph illustrating an example of a correction amount of an image formation condition calculated based on the normal detection result obtained by detecting the density correction pattern by the image density sensor.

FIG. 14A is a graph illustrating an example of the correction amount of the image formation condition calculated based on the normal detection result obtained by detecting the image density correction pattern by the image density sensor 70.

Figure 14B:
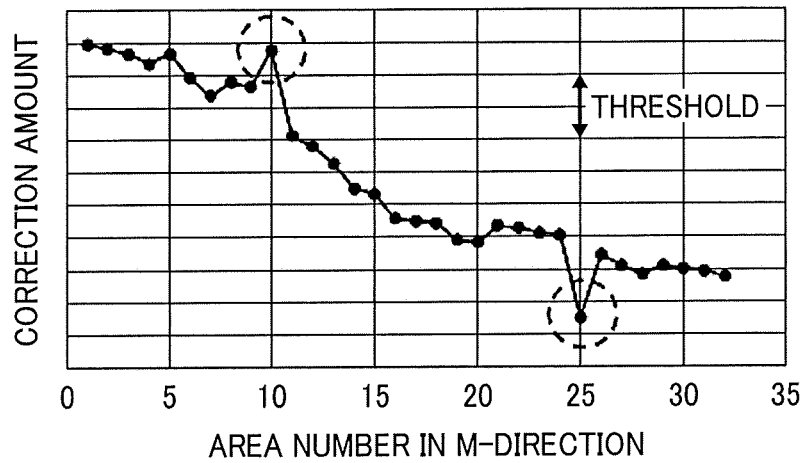
FIG. 14B is a graph illustrating an example of the correction amount of the image formation condition calculated based on the abnormal detection result obtained by detecting the density correction pattern by the image density sensor.

FIG. 14B is a graph illustrating an example of the correction amount of the image formation condition calculated based on the abnormal detection result obtained by detecting the image density correction pattern by the image density sensor 70.

Figure 14C:
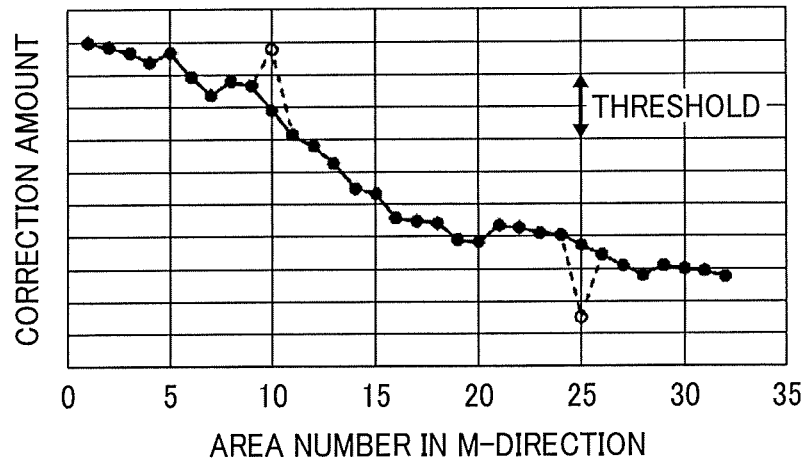
FIG. 14C is a graph after outliers in the correction amount of the image formation condition in FIG. 14B are replaced by replacement processing.

FIG. 14C is a graph after outliers in the correction amount of the image formation condition in FIG. 14B are replaced by the above-described replacement processing.

In FIGS. 14A, 14B, and 14C, the horizontal axis indicates the position of each area when the density correction pattern is divided into 32 areas along the main-scanning direction, and the vertical axis represents the correction amount of the image formation condition of each area. Hereinafter, data of the correction amount of the image formation condition as illustrated in graphs in FIGS. 14A, 14B, and 14C is referred to as a correction amount profile.

The method of dividing the area in the first embodiment illustrated in FIG. 10 and the method of dividing the area in the second embodiment illustrated in FIG. 14 are the same, and the horizontal axes of the graphs in FIGS. 10 and 14 coincide with each other. That is, for example, the area indicated by the area number 10 in FIG. 10 and the area indicated by the area number 10 in FIG. 14 are at the same position in the main-scanning direction. However, the method of dividing the area for detecting the image density and the method of dividing the area for calculating the correction amount of the image formation condition do not need to coincide with each other. The number of divisions of the area for calculating the correction amount of the image formation condition can be appropriately set to, for example, twice the number of divisions of the area for detecting the image density.

FIG. 14A corresponds to FIG. 10A and illustrates the correction amount profile when the image density sensor 70 is normal. In the normal correction amount profile, the difference in the correction amount of the image formation condition between adjacent areas is less than or equal to the predetermined threshold. Therefore, the difference in the correction amount of the image formation condition does not satisfy the above-described predetermined replacement execution condition. As a result, the correction amount profile in which the correction amount of the image formation condition is calculated based on the image density detected by the image density sensor 70 is used as it is in any area to correct the image formation condition such as the LD power.

FIG. 14B corresponds to FIG. 10B and illustrates the correction amount profile in which the same density correction pattern as in FIG. 14A is detected when the image density sensor 70 is abnormal. Specifically, the areas of the area number 10 and the area number 25 have outliers in which the image density changes abruptly as illustrated in FIG. 10B. As a result, the correction amounts of the image formation condition are outliers at the area numbers 10 and 25.

At that time, if the image formation condition is corrected by the correction amount profile using the correction amount of the image formation condition calculated from the image density profile in which the detected image density is used as it is across the entire area including the area number 10 and the area number 25, as described above, the image density corresponding to the area number 10 in the main-scanning direction is higher than the target image density. Similarly, with respect to the position in the main-scanning direction corresponding to the area number 25, the image density is corrected so as to be lower than the target image density. As a result, the black line as the abnormal image is generated at the position in the main-scanning direction corresponding to the area number 10, and the white line as the abnormal image is generated at the position in the main-scanning direction corresponding to the area number 25.

FIG. 14C illustrates a correction amount profile in which the correction amounts of the image formation condition of the areas of the area numbers 10 and 25 having outliers as illustrated in FIG. 14B are replaced by the above-described replacement processing. In the second embodiment, the correction amount of the image formation condition which has the outlier is not used as the correction amounts of the image formation condition of the areas of the area numbers 10 and 25 indicating the above-described outliers, that is, the corrected correction amount of the image formation condition is used. As a result, an abnormal image such as the black line and white line due to the outlier can be prevented.

Moreover, in the second embodiment, the average value of the correction amounts of the image formation condition of the two adjacent areas located on both sides of the area of interest is used as the correction amounts of the image formation condition of the areas of the area numbers 10 and 25 indicating the outliers. As a result, the correction amount of the image formation condition of the area used for correction of the image formation condition becomes an intermediate value of the correction amounts of the image formation condition of the two adjacent areas located on both sides of the area of interest. As illustrated in FIG. 14C, the correction amount profile is acquired in which the correction amount of the image formation condition does not abruptly change in the areas of the area numbers 10 and 25. As a result, the image density deviation in the area of interest is minimized, and high quality images can be obtained even if the replacement processing for replacing the correction amount of the image formation condition in the area of interest is executed.

Figures 15A, 15B:
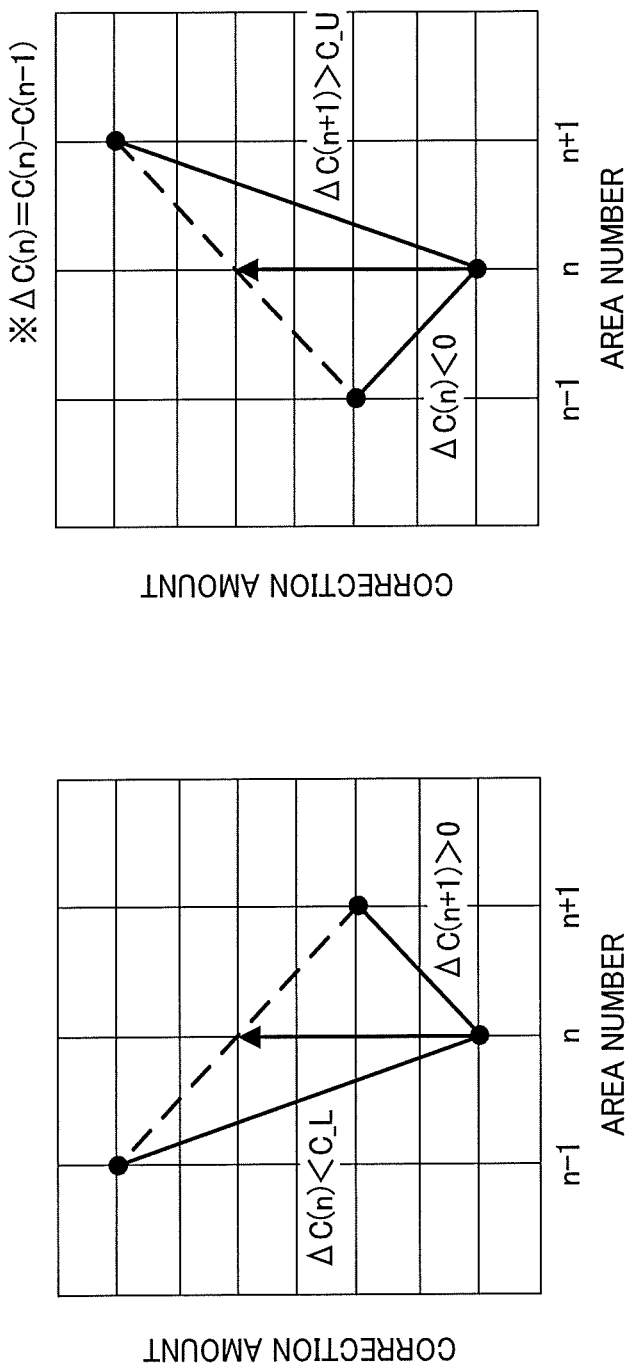
FIGS. 15A and 15B are graphs illustrating examples of replacement execution conditions and the replacement processing when the replacement execution conditions are satisfied.

FIGS. 15A and 15B are graphs illustrating the above-described replacement execution conditions and the replacement processing when the replacement execution condition is satisfied.

When the area of interest is an area of the area number n, the calculated correction amount of the image formation condition of the area of interest is C(n), and the calculated correction amounts of the image formation condition of the two adjacent areas adjacent to the area of interest are C(n−1) and C(n+1). The predetermined thresholds described above are C_L and C_U. At that time, in the second embodiment, when the following conditional expression, Expression 5 or Expression 6, is satisfied, the controller 180 determines that the area of interest satisfies the criteria for replacement and replaces the correction amount of the image formation condition of the area of interest with the average value of the calculated correction amounts of the image formation condition C(n−1) and C(n+1) of the two adjacent areas located on both sides of the area of interest.

$$C(n)-C(n-1)<C\_L \text{ and } C(n+1)-C(n)>0 \quad \text{Expression 5}$$

$$C(n)-C(n-1)<0 \text{ and } C(n+1)-C(n)>C\_U \quad \text{Expression 6}$$

Note that $\Delta C(x)$ means $C(x)-C(x-1)$. With this expression, the conditional expression, Expression 5 described above, is modified to the following conditional expression, Expression 5', that matches the conditional expression illustrated in FIG. 15A. Similarly, the above-described conditional expression, Expression 6, is modified to the following conditional expression, Expression 6', that matches the conditional expression illustrated in FIG. 15B.

$$\Delta C(n)<C\_L \text{ and } \Delta C(n+1)>0 \quad \text{Expression 5'}$$

$$\Delta C(n)<0 \text{ and } \Delta C(n+1)>C\_U \quad \text{Expression 6'}$$

The controller 180 determines whether the area of interest satisfies the criteria for replacement expressed by the above-described conditional expressions. If the calculated correction amount of the image formation condition of the area of interest is extremely low compared to at least one of the two adjacent areas located on both sides thereof, the controller 180 determines that the calculated correction amount of the image formation condition of the area of interest is an outlier and replace the outlier with the average value of the detected image densities of the two adjacent areas, thereby preventing the abnormal image such as the black line as described above.

Figure 16A:
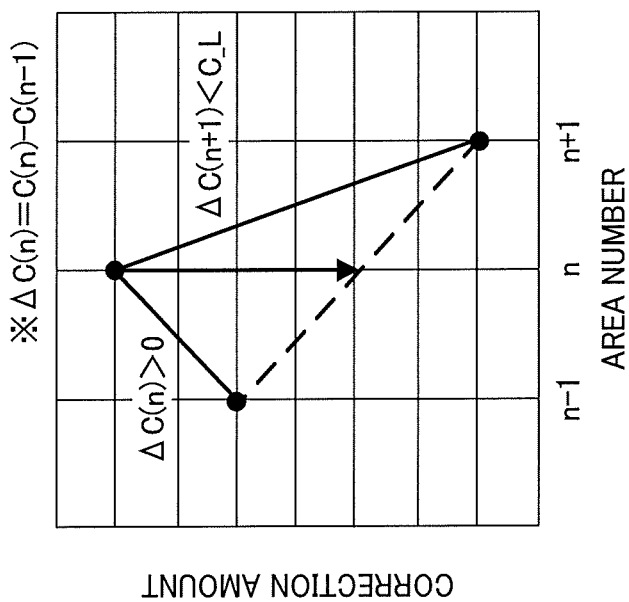
FIGS. 16A and 16B are graphs illustrating other examples of replacement execution conditions and the replacement processing when the replacement execution conditions are satisfied.
Figure 16B:
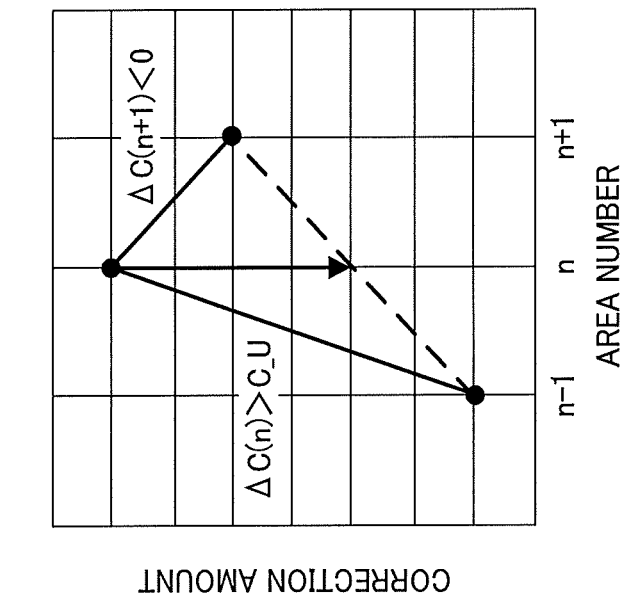

FIGS. 16A and 16B are graphs illustrating the above-described replacement execution conditions and the replacement processing when the replacement execution condition is satisfied.

In the second embodiment, when the following conditional expression, Expression 7 or Expression 8, is satisfied, the controller 180 determines that the area of interest satisfies the criteria for replacement and replaces the correction amount of the image formation condition of the area of interest with the average value of the calculated correction amounts of the image formation condition C(n−1) and C(n+1) of the two adjacent areas located on both sides of the area of interest.

$$C(n)-C(n-1)>C\_U \text{ and } C(n+1)-C(n)<0 \quad \text{Expression 7}$$

$$C(n)-C(n-1)>0 \text{ and } C(n+1)-C(n)<C\_L \quad \text{Expression 8}$$

The above-described conditional expression, Expression 7, is modified to the following conditional expression, Expression 7', that matches the conditional expression illustrated in FIG. 16A. Similarly, the above-described conditional expression, Expression 8, is modified to the following conditional expression, Expression 8', that matches the conditional expression illustrated in FIG. 16B.

$$\Delta C(n)>C\_U \text{ and } \Delta C(n+1)<0 \quad \text{Expression 7'}$$

$$\Delta C(n)>0 \text{ and } \Delta C(n+1)<C\_L \quad \text{Expression 8'}$$

The controller 180 determines whether the area of interest satisfies the criteria for replacement expressed by the above-described conditional expressions. If the calculated correction amount of the image formation condition of the area of interest is extremely high compared to at least one of the two adjacent areas located on both sides thereof, the controller 180 determines that the calculated correction amount of the image formation condition of the area of interest is an outlier and replace the outlier with the average value of the calculated correction amounts of the image formation condition of the two adjacent areas, thereby preventing the abnormal image such as the white line as described above.

In the second embodiment, the correction amount of the image formation condition of the area of interest satisfying the replacement execution condition is replaced with the average value of the calculated correction amounts of the image formation condition of the two adjacent areas located on both sides of the area of interest. Alternatively, the correction amount of the image formation condition of the area of interest can be replaced with the average value including the calculated correction amounts of the image formation condition of other areas if the average value includes the calculated correction amounts of the image formation condition of the two adjacent areas, thereby attaining the similar effect. For example, the correction amount of the image formation condition may be replaced with the average value of the calculated correction amounts of the image formation condition of four or more areas in total that include two or more areas following both sides of the area of interest satisfying the replacement execution condition.

The above-described thresholds C_L and C_U may be fixed values predetermined at a certain level at which an abnormal image, such as the black line and the white line, is not recognized. Alternatively, the controller 180 may calculate thresholds C_L and C_U from a standard deviation of part or all of the correction amounts of the image formation condition of respective areas calculated in step S13. Specifically, the thresholds C_L and C_U are increased when the standard deviation is high, and the thresholds C_L and C_U are reduced when the standard deviation is low. In this manner in which the controller 180 calculates the thresholds C_L and C_U from the standard deviation, the area to be replaced whose calculated correction amount of the image formation condition is significantly different from that of the adjacent area can be appropriately specified according to the degree of deviation of the calculated correction amount of the image formation condition in the main-scanning direction.

According to the present disclosure, even if foreign substances adhering to the image density detector cause the image density detector to detect an outlier of the detected image density, the image formation condition is not corrected based on the erroneous result that the image density deviation occurs in the area of interest.

The embodiments described above are examples, and the following aspects of the present disclosure can attain, for example, the following effects, respectively.

Aspect A

An image forming apparatus such as the image forming apparatus 1 includes an image forming device such as the printer engine 100 configured to form a correction image such as the density correction pattern, an image density detector such as the image density sensor 70 configured to detect image densities of a plurality of areas such as the areas of the area numbers 1 to 32 in the correction image, and circuitry such as the controller 180 configured to correct an image formation condition of the image forming device such as the LD power based on detected image densities of the plurality of areas detected by the image density detector. The circuitry is configured to execute replacement processing to replace a detected image density ID(n) of an area of interest selected from the plurality of areas with an average value of detected image densities ID(n−1), ID(n+1), and the like of two or more areas including adjacent areas adjacent to the area of interest and correct the image formation condition of the image forming device based on the detected image densities of the plurality of areas after the replacement processing when the differences ΔID(n−1) and ΔID(n+1) between the detected image density ID(n) of the area of interest and at least one of the detection image densities ID(n−1) and ID(n+1) of the adjacent areas exceeds predetermined thresholds ID_L or ID_U.

In general, an outlier of a detected image density when foreign substances adhere to the image density detector is largely different from the image density of the adjacent area adjacent to the area corresponding to the detected image density. Therefore, when the difference between the detected image density detected by the image density detector in the area of interest of the correction image and the detected image density of the adjacent area adjacent to the area of interest exceeds a predetermined threshold, the circuitry can determine that the detected image density in the area of interest is abnormal (an area where the image density is significantly different from the adjacent area). In this case, in the above-described embodiment, the replacement processing is executed, and the detected image density of the area of interest is replaced with the average value of the detected image densities of the two or more areas including adjacent areas adjacent to the area of interest. As a result, the outlier is not used for the area of interest to correct the image formation condition, and the image formation condition is not corrected based on the erroneous result that the image density deviation occurs in the area of interest. In addition, the detected image densities of the two or more areas including the adjacent areas adjacent to the area of interest are used for the area of interest. Therefore, if the detected image densities of the two or more areas are normal values, the image density of the area of interest used for correcting the image formation condition also indicates a normal value. As a result, the image density of the area of interest used to correct the image formation condition indicates a value close to the detected image densities of the adjacent areas, and the image density deviation does not occur in the area of interest in the image formed according to the image formation condition after correction.

Aspect B

In Aspect A, the circuitry executes the replacement processing when the following conditional expression expressed by Expression 1 or Expression 2 is satisfied.

$ID(n)-ID(n-1) < ID\_L$ and $ID(n+1)-ID(n) > 0$ \hspace{1em} Expression 1

$ID(n)-ID(n-1) < 0$ and $ID(n+1)-ID(n) > ID\_U$ \hspace{1em} Expression 2

Here, ID(n) is the detected image density of the area of interest, ID(n−1) and ID(n+1) are the detected image densities of the adjacent areas, and ID_L and ID_U are the predetermined thresholds.

According to Aspect B, the circuitry can appropriately determine that the detected image density of the area of interest indicates an extremely low outlier as compared to that of the adjacent area.

Aspect C

In Aspect A or B, the circuitry executes the replacement processing when the following conditional expression expressed by Expression 3 or Expression 4 is satisfied.

$ID(n)-ID(n-1) > ID\_U$ and $ID(n+1)-ID(n) < 0$ \hspace{1em} Expression 3

$ID(n)-ID(n-1) > 0$ and $ID(n+1)-ID(n) < ID\_L$ \hspace{1em} Expression 4

Here, ID(n) is the detected image density of the area of interest, ID(n−1) and ID(n+1) are the detected image densities of the adjacent areas, and ID_L and ID_U are the predetermined thresholds.

According to Aspect C, the circuitry can appropriately determine that the detected image density of the area of interest indicates an extremely high outlier as compared with that of the adjacent area.

Aspect D

In Aspect B or C, the circuitry such as the controller 180 calculates the predetermined thresholds ID_L and ID_U based on a standard deviation of the detected image densities of part or all of the plurality of areas before the replacement processing.

According to Aspect D, the circuitry can determine whether the area of interest is an area to be replaced whose detected image density is significantly different from that of the adjacent area, according to the degree of variation in the detected image densities.

Aspect E

An image forming apparatus such as the image forming apparatus 1 includes an image forming device such as the printer engine 100 configured to form a correction image such as the density correction pattern, an image density detector such as the image density sensor 70 configured to detect image densities of a plurality of areas such as the areas of the area numbers 1 to 32 in the correction image, and circuitry such as the controller 180 configured to correct an image formation condition of the image forming device such as the LD power based on calculated correction amounts calculated from the detected image densities of the plurality of areas detected by the image density detector. The circuitry is configured to execute replacement processing to replace a calculated correction amount C(n) of an area of interest selected from the plurality of areas with an average value of calculated correction amounts C(n−1), C(n+1), and the like of two or more areas including adjacent areas adjacent to the area of interest and correct the image formation condition of the image forming device based on the calculated correction amounts of the plurality of areas after the replacement processing when the difference ΔC(n−1) or ΔC(n+1) between the calculated correction amount C(n) of the area of interest and at least one of the calculated correction amounts C(n−1) and C(n+1) of the adjacent area exceeds predetermined thresholds C_L or C_U.

In general, an outlier of a calculated correction amount when foreign substances adhere to the image density detector is largely different from the correction amount of the adjacent area adjacent to the area corresponding to the calculated correction amount. Therefore, when the difference between the calculated correction amount in the area of interest of the correction image calculated by circuitry and the calculated correction amount of the adjacent area adjacent to the area of interest exceeds the predetermined threshold, the circuitry can determine that the calculated correction amount in the area of interest is an outlier (an area where the image density is significantly different from the adjacent area). In this case, in the above-described embodiment, the replacement processing is executed, and the correction amount of the area of interest is replaced with the average value of the calculated correction amount of the two or more areas including adjacent areas adjacent to the area of interest. As a result, the outlier is not used for the area of interest to correct the image formation condition, and the image formation condition is not corrected based on the calculated correction amount calculated from the erroneous result that the image density deviation occurs in the area of interest. In addition, values within the range of the calculated correction amounts of the two or more areas including adjacent areas adjacent to the area of interest are used for the area of interest. Therefore, if the calculated correction amounts of the two or more areas are normal values, the correction amount of the area of interest used for correcting the image formation condition also indicates a normal value. As a result, the calculated correction amount of the area of interest used to correct the image formation condition indicates a value close to the calculated correction amounts of the adjacent areas, and the image density deviation does not occur in the area of interest in the image formed according to the image formation condition after correction.

Aspect F

In Aspect E, the circuitry executes the replacement processing when the following conditional expression expressed by Expression 5 or Expression 6 is satisfied.

$C(n)-C(n-1)<C\_L$ and $C(n+1)-C(n)>0$      Expression 5

$C(n)-C(n-1)<0$ and $C(n+1)-C(n)>C\_U$      Expression 6

Here, C(n) is the calculated correction amount of the area of interest, C(n−1) and C(n+1) are the calculated correction amounts of the adjacent area, and C_L and C_U are the predetermined thresholds.

According to Aspect F, the circuitry can appropriately determine that the calculated correction amount of the area of interest indicates an extremely low outlier as compared with that of the adjacent area.

Aspect G

In Aspect E or F, the circuitry executes the replacement processing when the following conditional expression expressed by Expression 7 or Expression 8 is satisfied.

$C(n)-C(n-1)>C\_U$ and $C(n+1)-C(n)<0$      Expression 7

$C(n)-C(n-1)>0$ and $C(n+1)-C(n)<C\_L$      Expression 8

Here, C(n) is the calculated correction amount of the area of interest, C(n−1) and C(n+1) are the calculated correction amounts of the adjacent areas, and C_L and C_U are the predetermined thresholds.

According to Aspect G, the circuitry can appropriately determine that the calculated correction amount of the area of interest indicates an extremely high outlier as compared with that of the adjacent area.

Aspect H

In Aspect F or G, the circuitry such as the controller 180 calculates the predetermined thresholds C_L and C_U based on a standard deviation of the calculated correction amounts of part or all of the plurality of areas before the replacement processing.

According to Aspect H, the circuitry can determine whether the area of interest is an area to be replaced whose calculated correction amount is significantly different from that of the adjacent area, according to the degree of variation in the calculated correction amounts.

Aspect I

In any one of Aspects A to H, the adjacent areas are adjacent to the area of interest in a direction of conveyance of a recording medium on which the image forming device forms an image (e.g., the sub-scanning direction) or a direction perpendicular to the direction of conveyance of the recording medium (e.g., the main-scanning direction).

According to Aspect I, in the image density detector for detecting the image densities of the plurality of areas aligned in the direction of conveyance of the recording medium (i.e., the sub-scanning direction) or the direction perpendicular to the direction of the conveyance of the recording medium (i.e., the main-scanning direction), even if foreign substances adhering to the image density detector cause the image density detector to detect an outlier of the detected image density, the image formation condition is not corrected based on the erroneous result that the image density deviation occurs in the area of interest.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

What is claimed is:

1. An image forming apparatus comprising:
an image forming device configured to form a correction image;
an image density detector configured to detect image densities of a plurality of areas in the correction image; and
circuitry configured to correct an image formation condition of the image forming device based on detected image densities of the plurality of areas detected by the image density detector,
the circuitry configured to:
execute replacement processing to replace a detected image density of an area of interest selected from the plurality of areas with an average value of detected image densities of two or more areas including adjacent areas adjacent to the area of interest; and correct the image formation condition of the image forming device based on the detected image densities of the plurality of areas after the replacement processing, when a difference between the detected image density of the area of interest and at least one of the detected image densities of the adjacent areas exceeds a predetermined threshold.

2. The image forming apparatus according to claim 1, wherein the circuitry executes the replacement processing when either of the following conditional expressions expressed by Expression 1 or Expression 2 is satisfied:

$$ID(n)-ID(n-1)<ID\_L \text{ and } ID(n+1)-ID(n)>0 \qquad \text{Expression 1; or}$$

$$ID(n)-ID(n-1)<0 \text{ and } ID(n+1)-ID(n)>ID\_U \qquad \text{Expression 2,}$$

where ID(n) is the detected image density of the area of interest, ID(n−1) and ID(n+1) are the detected image densities of the adjacent areas, and ID_L and ID_U are predetermined thresholds including the predetermined threshold.

3. The image forming apparatus according to claim 2, wherein the circuitry calculates the predetermined thresholds ID_L and ID_U based on a standard deviation of the detected image densities of part or all of the plurality of areas before the replacement processing.

4. The image forming apparatus according to claim 1, wherein the circuitry executes the replacement processing when either of the following conditional expressions expressed by Expression 3 or Expression 4 is satisfied:

$$ID(n)-ID(n-1)>ID\_U \text{ and } ID(n+1)-ID(n)<0 \qquad \text{Expression 3; or}$$

$$ID(n)-ID(n-1)>0 \text{ and } ID(n+1)-ID(n)<ID\_L \qquad \text{Expression 4,}$$

where ID(n) is the detected image density of the area of interest, ID(n−1) and ID(n+1) are the detected image densities of the adjacent areas, and ID_L and ID_U are predetermined thresholds including the predetermined threshold.

5. The image forming apparatus according to claim 1 wherein the adjacent areas are adjacent to the area of interest in either a direction of conveyance of a recording medium on which the image forming device forms an image or a direction perpendicular to the direction of conveyance of the recording medium.

* * * * *